Figure 1:
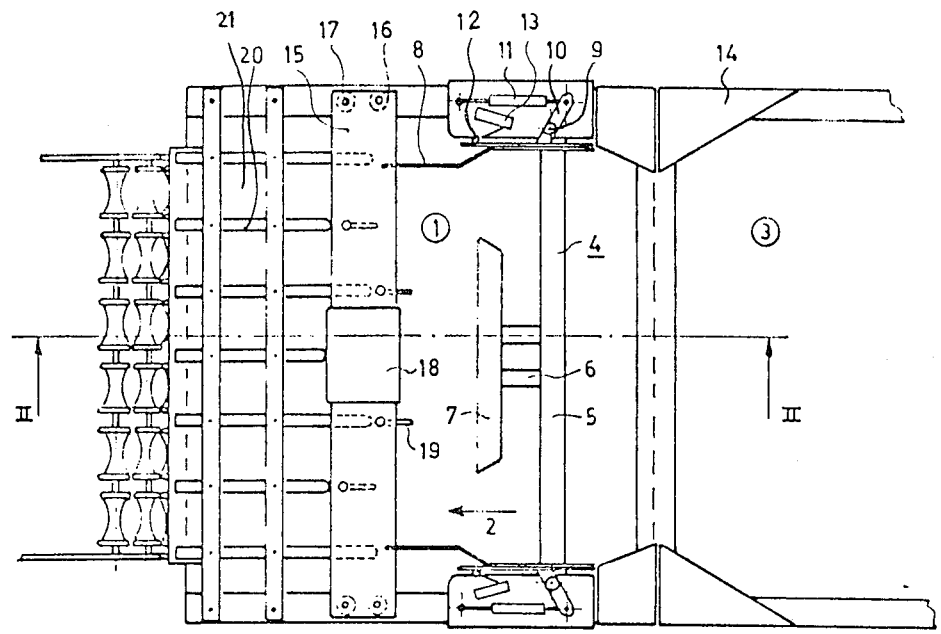

United States Patent [19]

van Kattenbroek

[11] 4,276,977
[45] Jul. 7, 1981

[54] DISTRIBUTION AND CONVEYOR APPARATUS FOR EGGS

[75] Inventor: Hendrik J. van Kattenbroek, Barneveld, Netherlands

[73] Assignee: Moba Holding Barneveld B.V., Barneveld, Netherlands

[21] Appl. No.: 902,718

[22] Filed: May 4, 1978

[30] Foreign Application Priority Data

May 5, 1977 [NL] Netherlands ............... 7704938

[51] Int. Cl.³ .................................. B65G 47/68
[52] U.S. Cl. ........................... 198/446; 198/445
[58] Field of Search ............ 198/446, 444, 445, 442, 198/448, 496, 848; 53/543

[56] References Cited

U.S. PATENT DOCUMENTS

| 766,013 | 7/1904 | Baldwin | 198/496 |
|---|---|---|---|
| 3,342,012 | 9/1967 | Reading | 198/446 X |
| 3,355,343 | 11/1967 | Beck | 198/848 X |
| 3,716,127 | 2/1973 | Loeffler | 198/446 |
| 3,749,227 | 7/1973 | Denherder | 198/446 X |

FOREIGN PATENT DOCUMENTS 719136 10/1965 Canada ...................... 198/445

Primary Examiner—Bruce H. Stoner, Jr.
Assistant Examiner—Douglas D. Watts
Attorney, Agent, or Firm—Larson and Taylor

[57] ABSTRACT

A distribution and conveyor apparatus for eggs having a smooth horizontally moving supporting surface and baffles which divide the width of said surface in a number of channels, and before said baffles a flat transverse member being fixedly mounted and preferably shaped such, that the resistance to the passing over of the eggs in the center of the supporting surface is stronger than at the edges.

15 Claims, 2 Drawing Figures

DISTRIBUTION AND CONVEYOR APPARATUS FOR EGGS

The invention relates to a distribution and conveyor apparatus for eggs, provided with a supporting surface and baffles dividing the width of said supporting surface in a number of channels, at least one thin transverse member being mounted on said supporting surface.

Such a distribution and conveyor apparatus is known, for instance from the Dutch Patent Specification No. 127,173..

Though distribution and conveyor apparatus of this type mainly function satisfactory nevertheless difficulties may occur. A first of them is that not always a sufficient equal distribution of the eggs over the different channels occurs. A further disadvantage is, that if stowage of eggs occurs the transverse members which with this construction move with respect to a non-moving supporting surface continuously pass below the same eggs, which can result in breakage; further it is with handling of eggs of the utmost importance, that they engage frictionally mechanical parts as less as possible, which with this known construction when stowing occurs clearly is not the case.

A final disadvantage is that with a non-moving supporting surface if it is soiled by the contents of an egg, regardless why this egg has been broken, the moving transverse members will smear the dirt out over the complete track, which makes cleaning especially difficult.

The invention aims to eliminate the above difficulties, at least to restrict them.

Accordingly it is provided according to the invention that the supporting surface is part of an endless band and that the transverse member is fixedly mounted.

According to a preferred embodiment of the invention it is provided that the transverse member is shaped such that in the middle region of the width of the supporting surface a greater resistance to rolling over of the eggs is created than at the side edges of the supporting surface.

By this shape of the transverse member it is possible to make the distribution of the eggs over the width of the supporting surface and consequently over the separate channels very equal.

Of course the greater resistance can be obtained in several ways with which according to a further preferred embodiment of the invention an additional transverse member is mounted that does not extend itself to the side edges of the supporting surface.

A further advantage of the invention is, that stowing of the eggs occurs before the transverse member. By reason of this the distribution and conveyor apparatus has always a sufficient stock of eggs.

Because with the invention, in contrary with the known technic, the eggs lay on a plane supporting surface, and consequently are propelled with relatively small forces, it is desirable, when they engage the baffles to provide according to an improvement of the invention in that a vibration mechanism is present, that is connected to the baffle members to impart to them a vibration perpendicular to the direction of movement of the supporting surface.

A further improvement of the invention consists in that along the side edges of the supporting surface sensors have been mounted, which are movable in the direction away from the supporting surface, a switch activating member being mounted in the track of the sensors, which member controls a switch which with activation by the sensor switches off the driving of an input web for the supporting surface. This feature is not only desired with irregular input of eggs, but also enables to keep the dimension of the supporting force before the transverse member small, where according to the invention stowage, if any, and stock building of the eggs occurs.

A further advantage of the invention is, that it is possible to clean the supporting surface, that with the invention is a moving one. A broken egg if any can only leave its contents on a single or a few transverse members, which of course can very easily and quickly be cleaned and which further even with a running machine are very well attainable.

Figure 2:
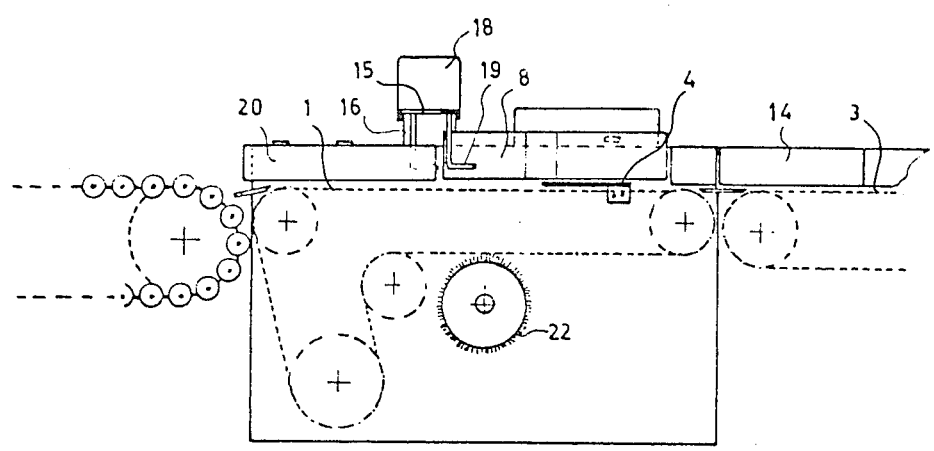

In the following the invention is further elucidated by hand of the drawing, in which FIG. 1 shows a plan view of a distribution and conveyor apparatus according to the invention; and FIG. 2 shows a cross section over the line II—II.

In the drawing reference 1 indicates a supporting surface that consists of an upper web of an endless band which runs on rollers known per se and not shown in the drawing, of which at least one is driven. From an input web 3 eggs are put on the supporting surface 1 in a known way, by reason of which they move along with this supporting surface in the direction of the arrow 2. Therewith they engage the transverse member 4 by reason of which they lay there a little while, but when more eggs come behind them, they are pushed over it.

In the shown embodiment the transverse member 4 consists of a plane strip 5, which by means of also plane strips 6 is connected to an additional transverse member 7, which consists also of a plane strip. Of course these strips may have baffled or rounded edges. When the eggs have passed strip 5 those of them, that are positioned in the middle, will further engage the strip 7, by reason of which the middle region that is to say seen in the width direction of the strip 7, the transport of the eggs is slower than near the edge regions. Herewith it should be considered, that eggs normally only pass over a strip if an egg coming behind it pushes it, so that with a transverse member, that in the middle creates more resistance by reason of the additional transverse member, a more equal distribution of the eggs over the whole width of the supporting surface 1 is obtained. Near the side edges of the supporting surface sensors have been applied about the position of the transverse member 4, which sensors have the shape of pivoting flaps 8 with a pivot point 9 and a prolongation 10, to which a telescope spring 11 is connected, which keeps the flaps 8 normally in the shown position.

If now a strong concentration of eggs occurs which are strongly stowed the flaps 8 are pivoted outwardly so that they activate the control member 12 of a switch 13, which stops the input web 3. When the concentration has been removed again and the flaps have returned under influence of the springs 11 to the position shown, the normal discharge again can occur.

The flaps 8 create by their shape also a narrowing of the pass way for the eggs, by reason of which a better distribution is obtained. Above the supporting surface a bridge 15 has been mounted by means of an elastical construction consisting of four elastic tubes 16, which by means of screws 17 mount the bridge 15 to the frame. The bridge 15 is provided with a vibrator 18 which in a known way can consist of an unbalanced wheel driven by an electro motor. This vibrator 18 in other respects is of known construction and can be replaced by known electromagnetically functioning vibrators, which use the frequency of the mains.

To the bridge pins 19 have been mounted which at their foresides have been rounded and which by the vibration of the bridge portion vibrate to and fro. Behind these pins fixed baffles 20 are mounted between the channels 21. The further discharge of eggs present in the channels occurs in a way known per se and is not further elucidated.

The endless band which forms the supporting surface 1 preferably is not smooth and slippery for exerting a greater propelling-force on the eggs. An interwoven web of wire of metal or plastic is here very well usable.

Not always the input of the eggs occurs in such a way, that they are regularly distributed over the width of the web 3. In case of a regular distribution the guide baffles 14 suffice to create together with the transverse member 4–7 a regular distribution.

When the eggs however, are applied at one side of the web 3 it may be desired for a good distribution to mount the transverse member 4–7 out of the center of the supporting surface 1. A good adjustability in this respect is possible by making the transverse member 4–7 adjustable in the direction perpendicular to the direction of movement of the surface 1.

Finally FIG. 2 shows a nylon brush 22, which cleans the surface 1 well, if soiling occurs by broken eggs.

What I claim is:

1. Distribution and conveyor apparatus for eggs comprising a moveable supporting surface for transport of the eggs, and at least one thin flat transverse member for controlling the distribution of eggs on said support surface being fixedly disposed in overlying relationship with respect to said supporting surface and extending completely across the width of the supporting surface such that all eggs transported by said supporting surface must pass over said at least one transverse member and said transverse member having a height above the support surface low enough for eggs to pass thereover when pushed by eggs behind them.

2. Distribution and conveyor apparatus according to claim 1 wherein said at least one transverse member is configured such that a greater resistance to rolling is created for eggs being transported in a middle region of said supporting surface than in side portions thereof, thereby causing a more equal distribution of eggs over the entire width of said supporting surface.

3. Distribution and conveyor apparatus according to claim 1 comprising first and second transverse members, said first transverse member being said member which extends across the width of said supporting surface to the side edges thereof, and said second transverse member extending across a portion of the width of said supporting surface.

4. Distribution and conveyor apparatus according to claim 3, in which said second transverse member is connected to said first transverse member by one or more flat strips.

5. Distribution and conveyor apparatus according to claim 3, in which said second transverse member is positioned behind said first transverse member, as viewed in the direction of movement of the supporting surface.

6. Distribution and conveyor apparatus according to claim 3, in which said second transverse member is longitudinally positionable so as to allow positioning thereof overlying different portions of the supporting surface.

7. Distribution and conveyor apparatus according to claim 1, in which the supporting surface is formed by a band of interwoven helical metal wires.

8. Distribution and conveyor apparatus according to claim 1, further comprising baffles dividing the width of said supporting surface in a number of channels and a vibrator mechanism that is connected to the baffles to impart to them a vibration perpendicular to the direction of movement of the supporting surface.

9. Distribution and conveyor apparatus according to claim 1 provided with an egg input web before the supporting surface, said web being provided with a driving means, sensors mounted at the side edges of the supporting surface which are movable in a direction away from said supporting surface, and a switch activating member mounted in the track of movement of said sensors, said member controlling a switch which, when it is activated by said sensor, switches off the driving means of said egg input web.

10. Distribution and conveyor apparatus according to claim 1, in which the supporting surface is delimited by side guides which from the side edges extend into the region that in the direction of movement of the supporting surface is beyond said transverse member.

11. Distribution and conveyor apparatus according to claim 1, in which the supporting surface is part of an endless band which cooperates with a cleaning brush.

12. Distribution and conveyor apparatus for eggs comprising a moveable support surface for transport of the eggs, a first thin transverse member for controlling the distribution of eggs on said support surface being fixedly disposed in overlying relationship with respect to said supporting surface and extending completely across the width of said supporting surface to the side edges thereof such that eggs transported by said supporting surface must traverse the first transverse member, and a second transverse member extending across a portion of the width of said supporting surface.

13. Distribution and conveyor apparatus according to claim 12, in which said second transverse member is connected to said first transverse member by one or more flat strips.

14. Distribution and conveyor apparatus according to claim 12, in which said second transverse member is positioned behind said first transverse member, as viewed in the direction of movement of the supporting surface.

15. Distribution and conveyor apparatus according to claim 12, in which said second transverse member is longitudinally positionable so as to allow positioning thereof overlying different portions of the supporting surface.

* * * * *